(12) United States Patent
Marinescu

(10) Patent No.: US 7,802,062 B2
(45) Date of Patent: Sep. 21, 2010

(54) NON-BLOCKING VARIABLE SIZE RECYCLABLE BUFFER MANAGEMENT

(75) Inventor: Adrian Marinescu, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 531 days.

(21) Appl. No.: 11/864,211

(22) Filed: Sep. 28, 2007

(65) Prior Publication Data
US 2009/0089495 A1    Apr. 2, 2009

(51) Int. Cl.
G06F 12/02 (2006.01)
(52) U.S. Cl. .......................... 711/156; 710/56; 711/173
(58) Field of Classification Search ................. 711/112, 711/110, 156, 170, 172, 173, E12.002
See application file for complete search history.

(56) References Cited

U.S. PATENT DOCUMENTS

| | | | |
|---|---|---|---|
| 5,404,474 | A | 4/1995 | Crook et al. |
| 6,151,660 | A | 11/2000 | Aoki |
| 6,802,066 | B1 | 10/2004 | Carden, IV et al. |
| 6,823,480 | B1 * | 11/2004 | Brown .......................... 714/44 |
| 7,042,948 | B2 | 5/2006 | Kim et al. |
| 7,146,473 | B1 | 12/2006 | Cantrill |
| 7,185,061 | B1 | 2/2007 | Gopal et al. |
| 2004/0153635 | A1 | 8/2004 | Kaushik et al. |
| 2006/0140204 | A1 | 6/2006 | Kurosaki et al. |
| 2007/0106844 | A1 * | 5/2007 | Ohkawa ..................... 711/130 |
| 2008/0270744 | A1 * | 10/2008 | Hashimoto ................... 711/217 |

FOREIGN PATENT DOCUMENTS

EP    1722301 A2 *    11/2006

OTHER PUBLICATIONS

Katiyar, Manish, et al. "Logging in multi-threaded applications efficiently with ring buffer" How to find and analyze bugs in your applications, IBM, Aug. 14, 2007, 6 pages http://www.ibm.com/developerworks/aix/library/au-buffer/au-buffer/index.html.
Dannenberg, Roger B., et al., "Design Patterns for Real-Time Computer Music Systems", Sep. 4, 2005, 8 pages http://www.cs.cmu.edu/~rbd/doc/icmc2005workshop/real-time-systems-concepts-design-patterns.pdf.

(Continued)

*Primary Examiner*—Pierre-Michel Bataille
(74) *Attorney, Agent, or Firm*—Workman Nydegger

(57) ABSTRACT

Buffer management system. A ring buffer may be implemented. The ring buffer includes a number of zones. Each of the zones includes state fields. The state fields include a filled indicator indicating whether the zone is full. The state fields for the zone further include a committed indicator indicating whether data in the zone is readable. The state fields for the zone also include a recycling indicator indicating whether the zone can be recycled. The ring buffer includes entries in the zones. Each of the entries includes state information. The entry state information includes a zone offset indication indicating a memory offset into the zone. The entry state information further includes a size indicating the size of the entry. The entry state information also includes a committed indicator indicating that the entry is readable.

20 Claims, 2 Drawing Sheets

OTHER PUBLICATIONS

Michael, Maged M., "Safe Memory Reclamation for Dynamic Lock-Free Objects Using Atomic Reads and Writes", PODC 2002 Jul. 21-24, 2002, Monterey, CA, pp. 1-10 http://www.research.ibm.com/people/m/michael/podc-2002.pdf.

Michael, Maged M., "Hazard Pointers: Safe Memory Reclamation for Lock-Free Objects", IEEE Transactions on Parallel and Distributed Systems, vol. 15, No. 6, Jun. 2004, pp. 491-504 http://www.research.ibm.com/people/m/michale/ieeetpds-2004.pdf.

\* cited by examiner

NON-BLOCKING VARIABLE SIZE RECYCLABLE BUFFER MANAGEMENT

BACKGROUND

Background and Relevant Art

Computers and computing systems have affected nearly every aspect of modern living. Computers are generally involved in work, recreation, healthcare, transportation, entertainment, household management, etc.

Computers may include queues, buffers, and/or protected memory for storing status, tracing and/or logging information, storing information for ordered computation or use, storing tasks for order execution, etc. In one example, typically in tracing and logging applications, buffer management is done with either ring-buffer algorithms which handle reliably the fixed size entries, or by using some synchronization primitives such as protecting memory by implementing locks, defining critical sections of execution flow where operations should be restricted etc. In some critical applications where preemption is possible, using locks can drastically affect the performance, by serializing further logging operations behind a thread that might have been preempted. Furthermore, such logging cannot typically be used to trace locking operations directly due to circularity problems.

Typical non-blocking approaches, such as ring buffers as mentioned above, do not have such issues, but they are usually implemented as fixed size allocations. If variable size allocations are needed, these allocations may be handled with an extra buffer, to which a first fixed size entry points. Additionally, for recyclable buffers, i.e. ring-buffers, there is an initial cost, O(n) where n is the total number of entries in the buffer, for buffer initialization which sets every entry into a free state.

The allocation for the variable size extension memory requires an arbitrary guess about the usage which might be inappropriate for a generic usage. If lower than needed, it will wrap faster than the ring-buffer leading to inconsistent entries, if oversized will lead to an inefficient memory usage.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes a method practiced in a computing environment, where the method includes acts for implementing a ring buffer. The method includes allocating memory for the ring buffer. The memory allocated for the ring buffer is divided into two or more zones. Dividing the memory allocated for the ring buffer into zones includes associating state with each zone. The state includes a filled indicator indicating whether the zone is full, a committed indicator indicating whether data in the zone is readable, and a recycling indicator indicating whether the zone can be recycled. The zones are divided into entries. Dividing the zones into entries includes assigning entry state information. The entry state information includes a zone offset indication indicating a memory offset into the zone, a size indicating the size of the entry, and a committed state allowing the entry to be published for queries.

Another embodiment described herein includes a computer readable medium which includes a ring buffer. The ring buffer includes a number of zones. Each of the zones includes state fields. The state fields include a filled indicator indicating whether the zone is full. The state fields for the zone further include a committed indicator indicating whether data in the zone is readable. The state fields for the zone also include a recycling indicator indicating whether the zone can be recycled. The ring buffer includes entries in the zones. Each of the entries includes state information. The entry state information includes a zone offset indication indicating a memory offset into the zone. The entry state information further includes a size indicating the size of the entry. The entry state information also includes a committed state allowing the entry to be published for queries.

Yet another embodiment described herein includes a system implementing a ring buffer. The system includes a number of zones implemented in a computer readable medium. Each of the zones includes fields including: a filled indicator indicating whether the zone is full, a committed indicator indicating whether data in the zone is readable, and a recycling indicator indicating whether the zone can be recycled. The system further includes entries in the zones where each of the entries includes state information. The entry state information includes a zone offset indication indicating a memory offset into the zone, a size indicating the size of the entry, and a committed state allowing the entry to be published for queries.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments herein may comprise a special purpose or general-purpose computer including various computer hardware, as discussed in greater detail below.

In one embodiment, buffer management is done at two levels: management of a group of entries grouped in zones, and the management of individual entries inside the zones. In particular, embodiments may be implemented where memory for a buffer is divided into zones. The zones include state information including flags specifying committed indications, filled indications, and recycling indications. A committed indication indicates that a zone is fully committed and that every entry that has been allocated from that zone was also committed. A filled indication indicates that a zone is filled with data and that subsequent entries should be made into a different zone. A recycling indicator indicates a zone is in the process of being recycled, preventing similar attempts from other potential threads. This state information can be used to ensure that data in a zone is protected as will be described in more detail below. Additionally, functionality will be illustrated below which allows for other zones to be used when a write operation is being performed on a zone.

Similarly, entries within the zone include state information. Each entry has associated with it a zone offset indicator indicating a memory offset into the zone where the entry is stored, size information indicating the size of the entry, and committed link information that is used by a zone to build a list with committed entries. This list is important for query operations, allowing only entries fully committed to be discovered in enumerations, making strong guarantees about consistency of the information.

Figure 1:
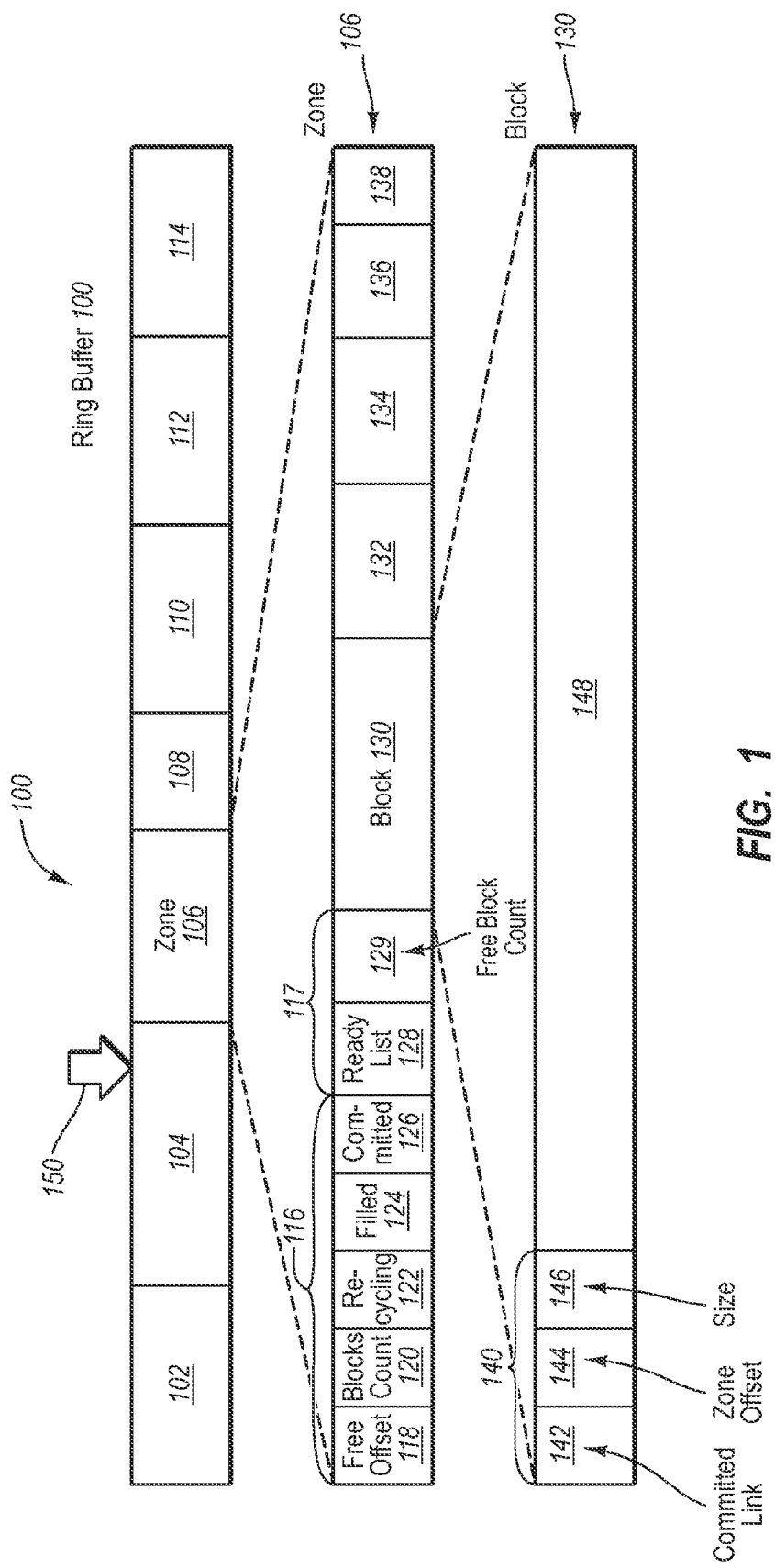
FIG. 1 illustrates a buffer implementing various features of embodiments described herein.

Referring now to FIG. 1, an example embodiment is illustrated. FIG. 1 illustrates a buffer 100. The buffer 100 in divided into a number of zones 102-114. Each zone includes state information 116. In the example illustrated, the state information for the zone 106 includes a free offset field 118, a blocks count field 120, a recycling indicator filed 122, a filled indicator field 124, and a committed indicator field 126. As will be explained in more detail below, the free offset field 118 indicates where the next free memory in the zone exists. The blocks count field 120 indicates the number of entry blocks in the zone. The recycling indicator field 122 indicates whether data in a zone is currently in the process of being recycled. The filled indicator field 124 indicates whether or not the zone is full. And the committed indicator field 126 indicates whether or not the data in the zone has been fully committed. A filled and fully committed zone is subject to recycling, if space for new entries is needed. The zone 106 includes additional state information 117 which tracks committed entries. This state information 117 contains two fields: a ready list field 128 which is a single linked list containing all committed entries, and free block count field 129 which includes a total commit counter, keeping track of the number of committed entries.

A zone also includes a number of entry blocks such as blocks 130-138. Each of the blocks also includes state information 140. The state information for the blocks includes a committed link filed 142, a zone offset field 144, and a size field 146. As will be explained in more detail below, the committed link field 142 allows a ready block to be listed from the zone, the zone offset field 144 indicates how far into the zone memory the block is stored, and the size field 146 indicates the size of the block.

When a buffer 100 is created, a decision can be made with respect to splitting the entire available memory into zones. In one embodiment, adjacent entries are grouped into zones to achieve memory reclamation in a ring-buffer in a non-blocking manner, while concurrent new entries are being created and queried.

Another value of the use of zones is to achieve consistent management if a memory buffer is being expanded with new memory. In particular, some embodiments allow for expansion by adding new zones while the buffer 100 is concurrently used for new entry creation operations, or queries or other enumerations. New zones do not need to be created adjacent in memory, which can facilitate the expansion of the buffer later as needed while the buffer still in use by other threads.

The actual number of zones and size of zones may be considered when zones are created. For example, one consideration may take into account the initial amount of memory that is managed and the largest size used for an entry. Because in some embodiments, an entry cannot span over multiple zones, the size of one zone should be larger than the largest anticipated buffer entry.

Another factor that may be considered in choosing the initial number of zones relates to targeted memory usage efficiency. As will be discussed in more detail below, in one embodiment of the buffer 100, memory is reclaimed atomically one zone at the time. As such, in one worst case scenario, only one zone from the entire buffer will no longer be able to be queried. Thus, for example, if the memory is initially split into 10 zones, the buffer 100 can have 90% efficient use of memory in the worst case.

As will be described in more detail herein, when a large number of concurrent readers and/or writers are expected to access the buffer 100, embodiments may implement a buffer that includes a corresponding large number of zones. This may be done because each of the zones may defer recycling reclamation until completion of a read or write operation.

As described previously, each zone has a small amount of state associated with it. Each zone, in one embodiment, is only initialized one time i.e. when the buffer 100 is originally set up, or when a new zone is added. Thus, initialization costs can be incurred once when zones are initialized, regardless of the amount of memory or number of potential entries that can be assigned for the buffer 100. This may be a large benefit over present mechanisms that use fixed size entries which typically require an O(n) initialization cost, where n is the number of total entries in the buffer.

At any given time, in one embodiment, only one zone is currently in use for new allocations and entries. This current zone may be tracked using zone cursor 150 which is illustrated graphically in FIG. 1, but may be implemented using pointers, flags or other data structures. As a zone of memory is filled up, the zone cursor 150 advances to the next zone. This continues until the last zone 114 is filled. When the last zone 114 is filled, the buffer 100 will attempt to reclaim the oldest zone for new entries, which in the example illustrated in FIG. 1 is the first zone 102 illustrated in the buffer 100. If concurrent read/write operations are already happening in the first zone 102, the next zone 104 will be attempted for recycling and reclamation to store new entries.

As noted previously, inside each zone are entry blocks, which are used in the next level of buffer management. This management may also be done in a non-blocking fashion. In one embodiment, a zone starts allocating memory for each entry from lower addresses, with each entry in progressively higher addresses. The zone maintains a pointer to the next available memory inside the zone. For example, as illustrated in FIG. 1, the zone 106 includes a free offset entry field 118 in the state information 116 which points to the next available memory in the zone.

The creation of an entry in the zone includes two steps: reserving memory and committing the entry. After memory is reserved for an entry, there is a strong guarantee that the memory will not reclaimed, nor written to by another concurrent operation. The entry will still be hidden from queries. As such, the data inside can be filled in any arbitrary order, at the discretion of the thread adding data to the entry. Committing the entry will atomically publish the entry to a ready list, such that entry becomes visible for queries. No further writes are allowed to this entry from this point as the entire zone might be reclaimed, and will potentially corrupt other new entries if they were allowed and if the zone has been recycled.

Each entry has a number of state fields as indicated by 140 used for the internal implementation of the buffer 100. The rest of the memory is used for the opaque content of the caller thread adding data to the entry. Each entry contains a size of data filed 146. This information may be required for query operations on the buffer. This value is filled in at allocation, by the buffer 100 mechanism. In some embodiments, the size filed 146 may not be used to parse the entries one by one because of concurrency issues. Potential race conditions may exist.

The system including the buffer 100 will keep track of each ready entry in the zone in a separate list. To accomplish this, the system uses another field in the state information 140 of each entry, which is a committed link field 142. The committed link field 142 may be a link in a single linked list to make the entry discoverable after it has been committed. Querying a zone for all completed/committed entries is accomplished by querying the list.

To manage new entry allocations, each zone has the state necessary for thread-safe allocation operations organized as illustrated in FIG. 1.

Notably, embodiments herein may be practiced in a computing environment. For example, embodiments may be practiced by executing instructions on a processor to perform an algorithm to operate on the buffer 100. In one embodiment the actual size of each field is evaluated according to the atomic compare and swap capabilities of the processor on which the instructions are being executed. For instance on x86 and x64 architectures, these compare and switch operations can be either 32 bits or 64 bits in total as both operations are supported. Because the memory management assumes contiguous memory inside of a zone, the requirements for representing a pointer for a new entry are less restrictive as a single offset illustrated at 118 relative to the start of the zone can be used. The chain of transitions will move the free-offset 118 up in value toward the end of the zone. Additionally an operation is performed to increase the block count 120. In one embodiment, all fields, including the state fields illustrated in FIG. 1, are atomically updated together, with the compare and swap primitives supported by the processor. As such, if a concurrent operation from another thread occurs updating these fields, the compare and swap for the other thread will fail and the other thread will have to repeat the capture and set instructions.

To manage the ready/committed entries, additional state information 117, which may be another word, can be implemented with the same guarantees of atomicity that the hardware primitives provide. The word 117 includes a ready list field 128 and a free block count field 129. The ready list field 128 is empty after initialization and after a segment has been reclaimed. In one embodiment, the ready list field 128 points to a single linked list containing committed entries. The free block count field 129 keeps track of number of ready entries. Further, the free block count field 129 can be used to guarantee the safety of memory reclamation of an entire zone. As in the allocation case, the updates of both fields happen atomically, with a similar compare and swap primitive. If concurrent commit operations happen, only one is guaranteed to make progress at a time. Any others will have to retry the update. The ready list field 128 will reflect the reverse order the entries are updated.

One significant invariant that can be noticed is that the free block count field is typically always less or equal than the blocks count field 120 from the state information 116 allocation structure. A zone can have an arbitrary number of entries in progress of being allocated, some in progress of being updated, and some already committed. However, one important transition is when a reservation/allocation of a new event fails. At that point, the filled indicator field 124 will be atomically set, and will trigger further verifications at each commit operation to see if the entire zone is fully committed or not. A zone in that state will also prevent new allocations from being added to that zone. A fully committed zone is one where every single entry that has been reserved has also completed and been inserted to the ready list. In this particular case the value of the free block count == blocks count field 120. This is a relevant state because it will guarantee that no further attempts to allocate or commit something to the particular zone will happen. As such, the entire zone can be recycled if needed. Each successful commit operation at the entry level can also perform a test to determine if the zone is fully committed. If the zone is fully committed, then the committed indicator field 126 can be updated to reflect this.

If new memory is needed and reclamation of a zone is necessary, a thread can attempt with an atomic operation to claim the recycling indicator field 122, which in one embodiment may be a status bit, of the zone while testing that filled (i.e. filled indicator field 124) and committed (i.e. committed indicator field 126) bits are still set. If the claim succeeds, that thread has full ownership of the entire zone and can do arbitrary operations necessary for reinitializing the zone, ensuring that for concurrent programming that the last operation is updating the allocate structure with an empty zone, and that the recycling indicator field 122 bit is cleared. If other competing threads try claiming the recycle field 122 bit at that point, the test for the filled and committed will fail, so those threads will abort zone recycling.

Figure 2:
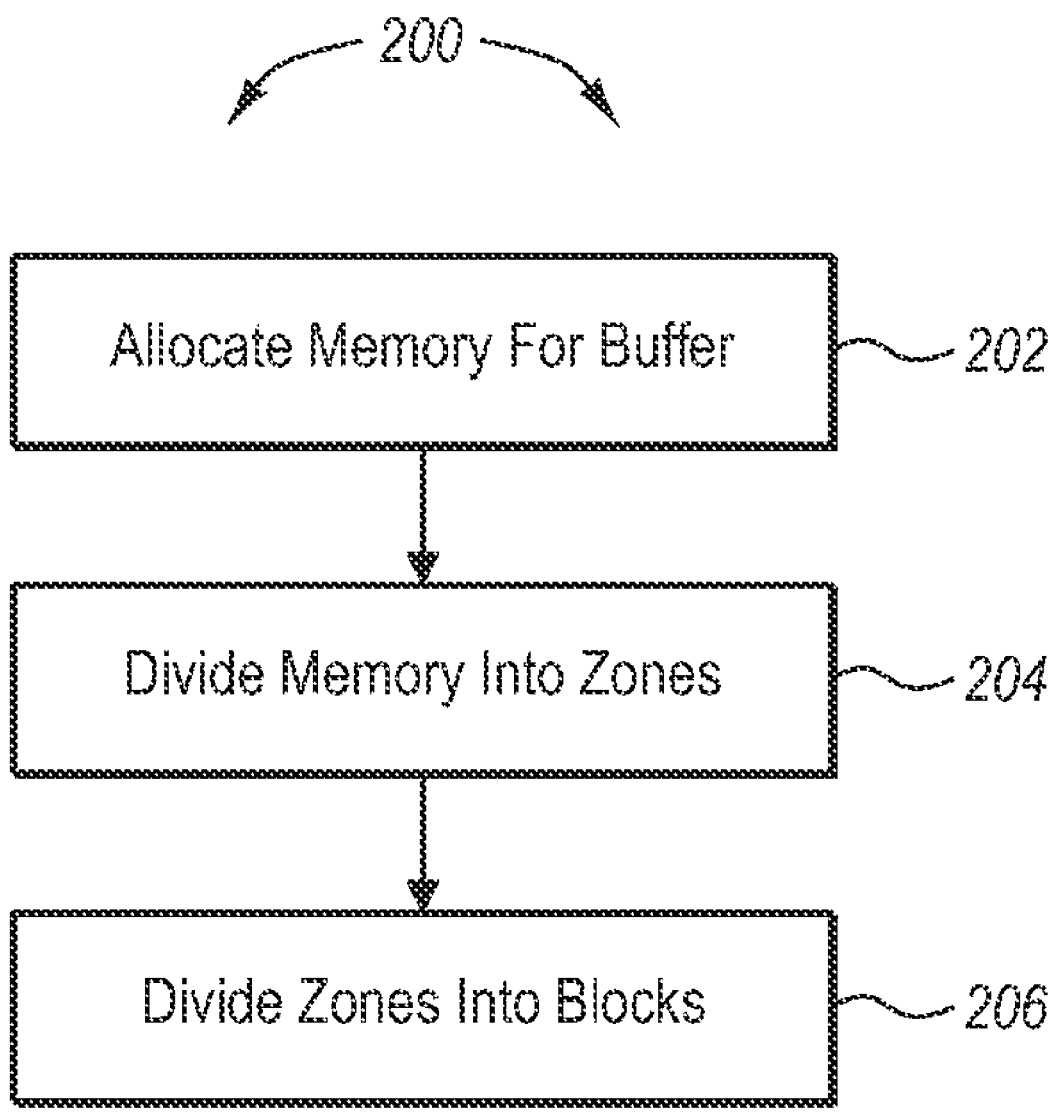
FIG. 2 illustrates a method of implementing a buffer.

Referring now to FIG. 2, an embodiment including a method is illustrated. The method 200 includes acts for implementing a ring buffer. The method 200 includes allocating memory for the ring buffer (act 202). The memory allocated for the ring buffer is divided into zones (act 204). Dividing the memory allocated for the ring buffers into zones (act 204) includes associating state with each zone. The state includes a filled indicator indicating whether the zone is full, a committed indicator indicating whether data in the zone is readable, and a recycling indicator indicating whether the zone can be recycled.

The method 200 further includes dividing the zones into entry blocks (act 206). Dividing the zones into entry blocks does not necessarily happen however at initialization time. It may happen later as needed for new entries to be allocated. There is no strict division of zones in blocks, as each one can have variable size, as dynamically requested by the application/system using the mechanisms described herein. When a new entry is then created, this includes assigning entry state information. The entry state information includes a zone offset indication indicating a memory offset into the zone and a size indicating the size of the entry. A space for the committed link is also reserved as part of the state information 140, but may not used until an entry is being committed.

In one embodiment, dividing the memory allocated for the ring buffer into zones (act 202) may include determining an allowable efficiency defining the efficiency with which memory resources in the ring buffer should be used and dividing the memory into a sufficient number of zones to meet the determined allowable efficiency. As illustrated previously, if a 90% efficiency is desired, the buffer can be divided into ten zones.

The method 200 may further include adding additional zones at runtime. In particular, as explained previously, embodiments may be implemented where new zones can be added at runtime instead of only adding zones when the buffer is initialized. In some embodiments, this may be enabled by the use of non-adjacent zones in memory, and in light of the fact that not all zones are in use at a given time allows new zones to be added.

The method 200 may be implemented such that dividing the memory allocated for the ring buffer into zones includes dividing the zones into non-uniform sizes. In particular, there is no requirement that the zones be of equal size.

Notably, as described previously, the method 200 may be implemented such that dividing the memory allocated for the ring buffer into two or more zones includes determining that a large number of concurrent readers and/or writers will be accessing the ring buffer and allocating a number of zones to accommodate the large number of concurrent readers and/or writers. For example, if it is known that many threads will be writing to or reading from a ring buffer, the ring buffer can be implemented with many zones to accommodate the users, as read and write operations being performed by one thread may make the zone unavailable to other threads.

The method 200 may be implemented such that dividing the memory allocated for the ring buffer into two or more zones includes determining a largest anticipated entry and allocating zones larger than the largest anticipated entry. As explained previously, in some embodiments, a single entry cannot span multiple zones. Thus, these embodiments may be further enhanced by determining an anticipated largest entry, and causing one or more zones to be large enough to accommodate the largest anticipated entry.

For storing an entry to a zone, the method 200 may further include reserving memory in a zone for an entry, writing the entry to the reserved memory, and committing the entry to publish the entry to one or more ready lists, such the that entry becomes visible for queries against the entry.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, system implementing a ring buffer, wherein the system comprising:
    a plurality of zones implemented in a computer readable storage medium, wherein each of the zones comprises fields including:
        a filled indicator indicating whether the zone is full;
        a committed indicator indicating whether data in the zone is readable; and
        a recycling indicator indicating whether the zone is being recycled;
    entries in the zones wherein each of the entries comprises state information, the entry state information comprising:
        a zone offset indication indicating a memory offset into the zone;
        a size indicating the size of the entry; and
        a committed state allowing the entry to be published for queries.

2. The system of claim 1, further comprising computer readable media comprising computer executable instructions, that when executed by a processor cause compare and switch operations to be performed on fields in the buffer.

3. The system of claim 2, wherein entries in the zones are sized according to compare and switch capabilities of the processor.

4. The system of claim 2, wherein the computer executable instructions cause entry fields and state fields to be updated together.

5. The system of claim 1, further comprising computer readable media comprising computer executable instructions, that when executed by a processor cause a pointer to be implemented for tracking a zone where current entries are being entered.

6. In a computing environment, a computer readable storage medium comprising a ring buffer, wherein the ring buffer comprises:
    a plurality of zones, wherein each of the zones comprises fields including:
        a filled indicator indicating whether the zone is full;
        a committed indicator indicating whether data in the zone is readable; and
        a recycling indicator indicating whether the zone is being recycled;
    entries in the zones, wherein each of the entries comprises state information, the entry state information comprising:
        a zone offset indication indicating a memory offset into the zone;
        a size indicating the size of the entry; and
        a committed state allowing the entry to be published for queries.

7. The computer readable medium of claim 6, wherein the ring buffer further comprises a committed list, wherein the committed list comprises a listing of entries that can be read or queried.

8. The computer readable medium of claim 6, wherein the ring buffer comprises a number of zones selected to achieve a predetermined efficiency.

9. The computer readable medium of claim 6, wherein the ring buffer comprises a number of zones selected to accommodate a predetermined number of threads expected to operate on the ring buffer.

10. The computer readable medium of claim 6, wherein the ring buffer comprises zones of non-uniform size.

11. The computer readable medium of claim 6, wherein the ring buffer comprises one or more zones sized to accommodate a largest anticipated entry.

12. The computer readable medium of claim 6, wherein each zone further comprises a free offset field indicating a memory offset into the zone where a new entry can be entered.

13. The computer readable medium of claim 6, wherein each zone further comprises a blocks count field indicating the number of entries in the zone.

14. In a computing environment, a method of implementing a ring buffer, the method comprising:
    allocating memory for the ring buffer;
    dividing the memory allocated for the ring buffer into two or more zones, wherein dividing the memory allocated for the ring buffer into zones comprises associating state with each zone, wherein the state comprises a filled indicator indicating whether the zone is full, a committed indicator indicating whether data in the zone is readable, and a recycling indicator indicating whether the zone is being recycled;
    dividing the zones into entries, wherein dividing the zones into entries comprises assigning entry state information, the entry state information comprising a zone offset indication indicating a memory offset into the zone, a size indicating the size of the entry, and a committed state allowing the entry to be published for queries.

15. The method of claim 1, wherein dividing the memory allocated for the ring buffer into two or more zones comprises:
    determining an allowable efficiency defining the efficiency with which memory resources in the ring buffer should be used; and
    dividing the memory into a sufficient number of zones to meet the determined allowable efficiency.

16. The method of claim 1, further comprising adding additional zones at runtime.

17. The method of claim 1, wherein dividing the memory allocated for the ring buffer into two or more zones comprises dividing the zones into non-uniform sizes.

18. The method of claim 1, wherein dividing the memory allocated for the ring buffer into two or more zones comprises:
    determining that a large number of concurrent readers and/or writers will be accessing the ring buffer; and
    allocating a number of zones to accommodate the large number of concurrent readers and/or writers.

19. The method of claim 1, wherein dividing the memory allocated for the ring buffer into two or more zones comprises:
    determining a largest anticipated entry; and
    allocating zones larger than the largest anticipated entry.

20. The method of claim 1, further comprising:
    reserving memory in a zone for an entry;
    writing the entry to the reserved memory; and
    committing the entry to publish the entry to one or more ready lists, such that the entry becomes visible for queries.

* * * * *